(12) United States Patent
Nakaya

(10) Patent No.: US 6,328,481 B1
(45) Date of Patent: Dec. 11, 2001

(54) ARRAYED OPTICAL FIBER CONNECTOR

(75) Inventor: Kenichi Nakaya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,637

(22) Filed: Feb. 26, 1999

(30) Foreign Application Priority Data

Feb. 26, 1998 (JP) .................................................. 10-044878

(51) Int. Cl.[7] .................................................. G02B 6/36
(52) U.S. Cl. .............................. 385/83; 385/82; 385/52; 385/63; 385/65; 385/115
(58) Field of Search ............................ 385/83, 59, 63, 385/65, 71, 76, 52, 64, 82, 114, 115

(56) References Cited

U.S. PATENT DOCUMENTS

| | | | |
|---|---|---|---|
| 4,109,994 | * | 8/1978 | Chown ................................ 385/82 X |
| 4,132,461 | * | 1/1979 | Jacques et al. ..................... 385/82 X |
| 4,208,094 | * | 6/1980 | Tomlinson, III et al. .......... 350/96.2 |
| 4,490,007 | * | 12/1984 | Murata ............................... 385/82 X |
| 4,735,479 | * | 4/1988 | Nicholls ............................. 350/96.2 |
| 5,566,262 | * | 10/1996 | Yamane et al. ....................... 385/33 |
| 5,812,726 | * | 9/1998 | Jinnai et al. ......................... 385/137 |
| 5,901,262 | * | 5/1999 | Kobayashi et al. ................... 385/89 |
| 6,027,253 | * | 2/2000 | Ota et al. ............................. 385/83 |

* cited by examiner

Primary Examiner—Brian Healy
(74) Attorney, Agent, or Firm—Ostrolenk, Faber, Gerb & Soffen, LLP

(57) ABSTRACT

An arrayed optical fiber connector for positioning multiple optical fibers to align the end faces of the optical fibers with multiple optical axes at a given input/output face of light is constructed as a board that includes a groove in which the multiple optical fibers are disposed in a given alignment arrangement; a fixing member that is received in the groove and is laid with the multiple optical fibers in a given alignment arrangement; and a fixing plate that is fixed on the surface of the board in which the groove is formed and fixes the multiple optical fibers and the fixing members inside the groove while securing the given alignment arrangement of the multiple optical fibers and the fixing members.

8 Claims, 3 Drawing Sheets

ARRAYED OPTICAL FIBER CONNECTOR

FIELD OF THE INVENTION

This invention relates to a arrayed optical fiber connector that is used to fix multiple optical fibers in alignment and to optically connect with an optical waveguide element with multiple input/output ports.

BACKGROUND OF THE INVENTION

Along with the practical application of optical communication system in recent years, the system with large capacity, multiple functions and high speed has been required. For example, to generate optical signal with higher speed, to demultiplex/multiplex optical wavelengths in a same optical transmission line, and to add a new function such as switching/exchanging of optical transmission line are required.

Of them, especially optical waveguide elements, such as AWG (arrayed waveguide grating) that enables the demultiplexing/multiplexing of optical wavelengths, and a matrix switch that enables the switching of optical transmission line, have been actively developed. The input/output part of these optical waveguide elements are structured such that multiple optical waveguides are arranged at equal intervals, and, to facilitate the optical connection with optical transmission line such as an optical fiber, it employs a arrayed optical fiber connector.

FIG. 1 is a perspective view showing a conventional arrayed optical fiber connector. The arrayed optical fiber connector 10 is structured such that multiple (four, in this example) optical fibers 11a, 11b, 11c and 11d, each of which having a core 1 and a clad 2, are disposed in an alignment assembly 12.

The alignment assembly 12 is composed of a nearly rectangular-solid-shaped board 13 and a fixing plate 14 that has the same form as the board 13 except having a thickness less than the board 13.

The board 13 is provided with a rectangular-cross-sectional groove 13a that contains the optical fibers in alignment at its bottom. The groove 13a has a length that extends through between two sides orthogonal to its bottom, a depth that is nearly equal to the diameter of the optical fibers 11a to 11d, and a width that is equal to the sum of the diameters of the optical fibers 11a to 11d.

The method of assembling the arrayed optical fiber connector 10 thus composed is explained. First, the tips of the four optical fibers 11a to 11d are, side by side, inserted into the groove 13a provided on the board 13, and adhesive 15 is filled into the clearance between the groove 13a and the optical fibers 11a to 11d. Then, the fixing plate 14 is disposed on the surface where the groove 13a is formed of the board 13, brought in contact with the optical fibers 11a to 11d.

Then, by heating the board 13 to harden adhesive 15 while pressing the fixing plate 14, the board 13, the optical fibers 11a to 11d and the fixing plate 14 are integrally fixed, thereby obtaining the arrayed optical fiber connector 10.

The basic performance required to the arrayed optical fiber connector 10 is that the optical fibers 11a to 11d do not incur the positional deviation when the end face of the arrayed optical fiber connector 10 is polished and after it is connected with an optical waveguide element. If the optical fibers 11a to 11d incur the positional deviation, there occurs a deterioration in performance such as an increase in connection loss with optical wavelength element that causes a reduction in reliability of optical wavelength element.

However, in the conventional arrayed optical fiber connector 10, there is a problem that it is difficult to prevent the optical fibers 11a to 11d from incurring the positional deviation when the end face of the arrayed optical fiber connector 10 is polished and after it is connected with an optical waveguide element.

FIG. 2 is a plan view illustrating the problem of the conventional arrayed optical fiber connector.

As shown, due to the low precision in processing the groove 13a, the board 13 used for the arrayed optical fiber connector 10 has been manufactured such that the bottom of the groove 13a is declined comparing with the upper surface of the board 13. In this case, even when, like the above method, the optical fibers 11a to 11d and the fixing plate 14 are integrally fixed while using the board 13 thus manufactured, the fixing plate 14 does not contact all the optical fibers 11a to 11d since the bottom of the groove 13a is declined. As a result, clearances da, db, dc and dd must occur between the fixing plate 14 and the optical fibers 11a to 11d.

Thus, the fixing force between the fixing plate 14 and the optical fibers 11a to 11d is reduced, and the optical fibers 11a to 11d each are likely to incur the positional deviation according to the clearances da, db, dc and dd when the end face of the arrayed optical fiber connector 10 is polished and after it is connected with an optical waveguide element. Because of this, it is difficult to perfectly prevent the positional deviation.

SUMMARY OF THE INVENTION

Accordingly, it is an object of the invention to provide a arrayed optical fiber connector that the positional deviation of optical fiber can be easily prevented.

According to the invention, a arrayed optical fiber connector for positioning multiple optical fibers to align the end faces of the optical fibers to multiple optical axes at a given input/output face of light, comprises:

a board that includes a groove in which the multiple optical fibers are disposed in a given alignment state;

a fixing member that is received in the groove and is laid with the multiple optical fibers in a given alignment state; and a fixing plate that is fixed on the surface, in which the groove is formed, of the board and fixes the multiple optical fibers and the fixing members inside the groove while keeping the given alignment states of the multiple optical fibers and the fixing members.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
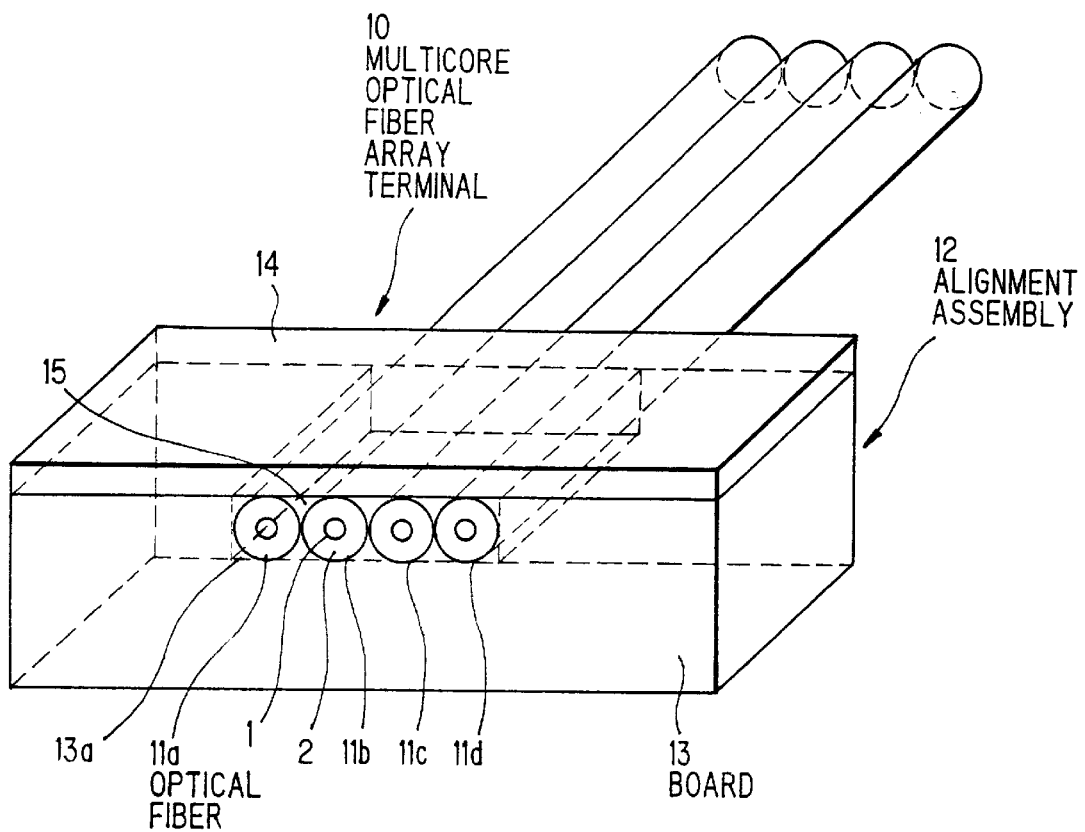
FIG. 1 is a perspective view showing a conventional arrayed optical fiber connector.
Figure 2:
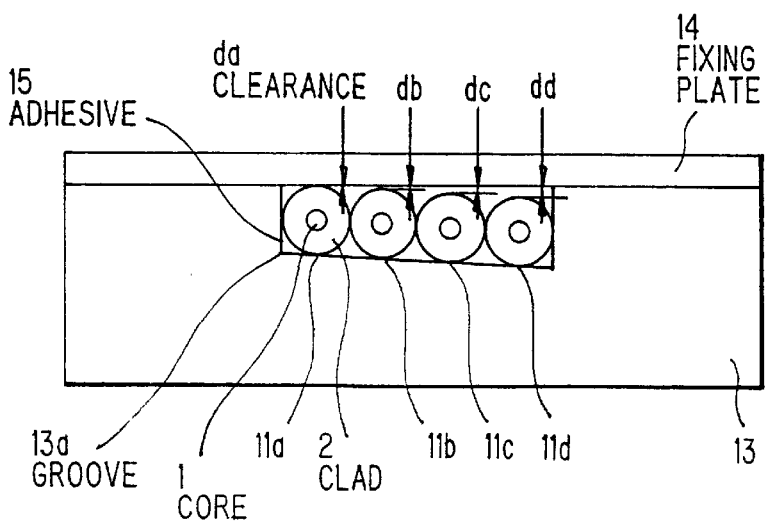
FIG. 2 is a plan view illustrating the problem of the conventional arrayed optical fiber connector.
Figure 3:
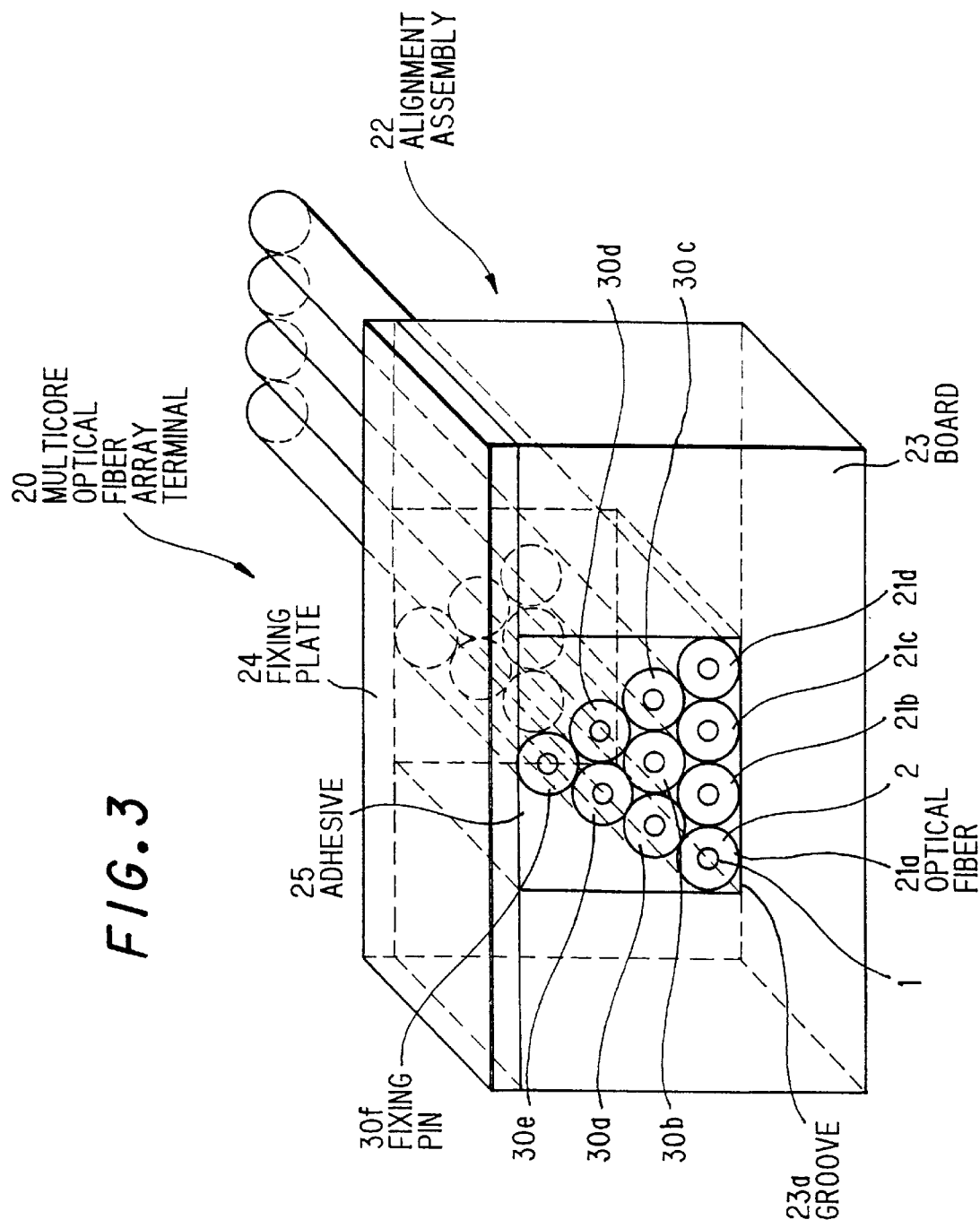
FIG. 3 is a perspective view showing a arrayed optical fiber connector in a preferred embodiment according to the invention

FIG. 3 shows a arrayed optical fiber connector in the preferred embodiment according to the invention.

The arrayed optical fiber connector 20 is structured such that multiple (four, in this embodiment) optical fibers 21a, 21b, 21c and 21d, each of which having a core 1 and a clad 2, are disposed in an alignment assembly 22. For example, as the optical fibers 21a to 21d, a single-mode fiber line with a diameter of 125 µm and a transmission center wavelength of 1.55 µm is used.

The alignment assembly 12 is composed of a nearly rectangular-solid-shaped board 23, a fixing plate 24 that has the same form as the board 13 except having a thickness less than the board 23, and multiple (six, in this embodiment) fixing pins (fixing members) 30a, 30b, 30c, 30d, 30e and 30f.

The board 23 is provided with a rectangular cross-sectional groove 23a that contains the optical fibers 21a to 21d in alignment at its bottom and further contains stacking the fixing pins 30a to 30f on the optical fibers 21a to 21d. The board 23 is, for example, of glass such as silica glass, ceramics or the like whose dimensions are 2 mm in height, 3 mm in width and 5 mm in length. Also, the fixing plate 24 is, for example, of glass such as silica glass, ceramics or the like whose dimensions are 2 mm in height, 3 mm in width and 5 mm in length.

The fixing pins 30a to 30f has a diameter nearly equal to that of the optical fibers 21a to 21d and a thickness nearly equal to that of the groove 23a. The fixing pins 30a to 30f are made by carving out, e.g., a single-mode fiber line with a diameter of 125 µm and a transmission center wavelength of 1.55 µm, or are made of glass such as silica glass, ceramics or the like.

The groove 23a has a length that extends through between two sides orthogonal to its bottom, a depth that is nearly equal to the stack height of the optical fibers 21a to 21d and the fixing pins 30a to 31f, and a width that is equal to the sum of the diameters of the optical fibers 21a to 21d, for example, 500 µm when using a single-mode fiber line with a diameter of 125 µm and a transmission center wavelength of 1.55 µm as the optical fibers 21a to 21d.

Inside the groove 23a, the four optical fibers 21a to 21d are, side by side, aligned at the bottom of the groove 23a, the three fixing pins 30a, 30b and 30c are laid on the optical fibers 21a to 21d so that each of them locates between adjacent two of the optical fibers 21a to 21d, the two fixing pins 30d and 30e are laid on the fixing pins 30a to 30c so that each of them locates between adjacent two of the fixing pins 30a to 30c, one fixing pin 30f is laid on the fixing pins 30d and 30e so that it locates between the fixing pins 30d and 30e.

With such arrangement, the optical fibers 21a to 21d can be positioned inside the groove 23a, as detailed later. Namely, the optical fibers 21a to 21d, which are side by side aligned at the bottom of the groove 23a, are contacting each other and the optical fibers 21a and 21d on both ends each are contacting the side of the groove 23a. Therefore, the lateral movement of the optical fibers 21a to 21d is restricted, thereby the optical fibers 21a to 21d can be positioned in the lateral direction.

Also, the fixing pins 30a to 30c, which are laid on the optical fibers 21a to 21d, are contacting each other, and the fixing pins 30a to 30c are contacting the lower two optical fibers (21a, 21b), (21b, 21c), and (21c, 21d), respectively.

Therefore, the lateral movement of the fixing pins 30a to 30c is restricted, thereby the fixing pins 30a to 30c can be positioned in the lateral direction. Furthermore, since the vertical movement of the optical fibers 21a to 21d is restricted by the upper fixing pins 30a to 30c, the optical fibers 21a to 21d can be positioned in the vertical direction.

Also, the fixing pins 30d and 30e, which are laid on the fixing pins 30a to 30c, are contacting each other, and the fixing pins 30d and 30e are contacting the lower two fixing pins (30a, 30b) and (30b, 30c), respectively. Therefore, the lateral movement of the fixing pins 30d, 30e is restricted, thereby the fixing pins 30d, 30e can be positioned in the lateral direction. Furthermore, since the vertical movement of the fixing pins 30a to 30c is restricted by the upper fixing pins 30d, 30e, the fixing pins 30a to 30c can be positioned in the vertical direction.

Further, the fixing pin 30f, which is laid on the fixing pins 30d, 30e, is contacting the lower two fixing pins (30a, 30b) and (30b, 30c), respectively. Therefore, the lateral movement of the fixing pin 30f is restricted, thereby the fixing pin 30f can be positioned in the lateral direction. Furthermore, since the vertical movement of the fixing pins 30d, 30e is restricted by the upper fixing pin 30f, the fixing pins 30d, 30e can be positioned in the vertical direction.

Moreover, the uppermost fixing pin 30f is contacting the fixing plate 24. Therefore, the vertical movement of the fixing pin 30f is restricted, thereby the fixing pin 30f can be positioned in the vertical direction.

As described above, the optical fibers 21a to 21d and the fixing pins 30a to 30c are disposed such that they are stacked forming a triangle-cross-section. Therefore, by pressing down only the fixing pin 30f by the fixing plate 24, all of the optical fibers 21a to 21d and the fixing pins 30a to 30c can be pressed down and positioned. Because of this, the high-precision manufacturing of the components, especially the depth of the groove 23a, of the arrayed optical fiber connector 20 is not necessary, which makes the manufacturing easy. In addition, the high-precision assembling, especially the positioning of the optical fibers 21a to 21d when attaching the fixing plate 24, of the arrayed optical fiber connector 20 is not necessary, which makes the assembling easy.

The method of assembling the arrayed optical fiber connector 20 thus composed is explained. First, the tips of the four optical fibers 21a to 21d are, side by side, inserted into the groove 23a provided on the board 23, and then the three fixing pins 30a to 30c are laid on the optical fibers 21a to 21d so that each of them locates between adjacent two of the optical fibers 21a to 21d.

Further, the two fixing pins 30d, 30e are laid on the fixing pins 30a to 30c so that each of them locates between adjacent two of the fixing pins 30a to 30c. One fixing pin 30f is laid on the fixing pins 30d, 30e so that it locates between the fixing pins 30d, 30e.

Then, adhesive 25 is filled into the clearance between the groove 23a and the optical fibers 21a to 21d and the fixing pins 30a to 30c. This adhesive 25 used is, for example, thermosetting type epoxy-system adhesives.

Then, the fixing plate 24 is disposed on the surface where the groove 23a is formed of the board 23, brought in contact with the fixing pin 30f, equally pressing down the fixing pin 30f in the direction of the groove 23a.

Finally, by heating the board 23 to harden adhesive 25 while pressing the fixing plate 24, the board 23, the optical fibers 21a to 21d, fixing pins 30a to 30c and the fixing plate 24 are integrally fixed, thereby obtaining the arrayed optical fiber connector 20.

Figure 4:
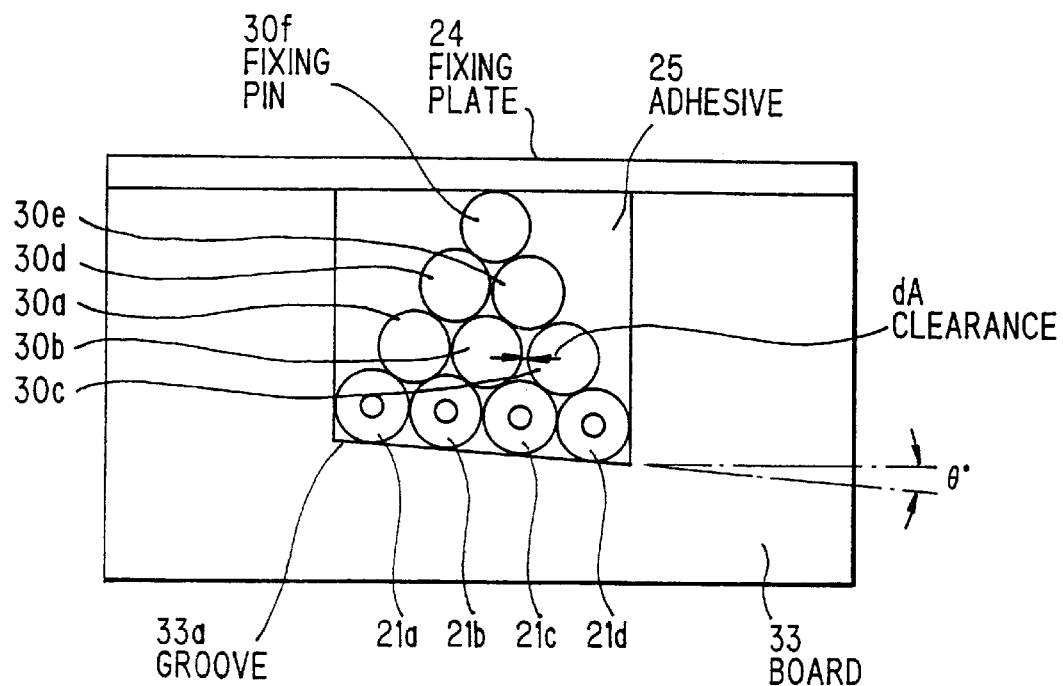
FIG. 4 is a plan view showing an example of a arrayed optical fiber connector, which uses a board with a groove that has an error in manufacture, according to the invention.

FIG. 4 is a plan view showing an example of a arrayed optical fiber connector, which uses a board with a groove that has an error in manufacture, according to the invention. In FIG. 4, like parts are indicated by like reference numerals as used in FIG. 3 and their explanations are omitted herein.

The board 33 has been manufactured such that the bottom of the groove 33a is θ°, e.g., 2°, declined to the top face.

In using the board 33 thus manufactured, as shown in FIG. 4, though a clearance dA occurs between the fixing pins 30b and 30c, the fixing pin 30c is contacting the lower optical fibers 21c, 21d and is contacting the upper fixing pin 30e. Therefore, the lateral and vertical movements are restricted, thereby no positional deviation occurs.

Figure 5:
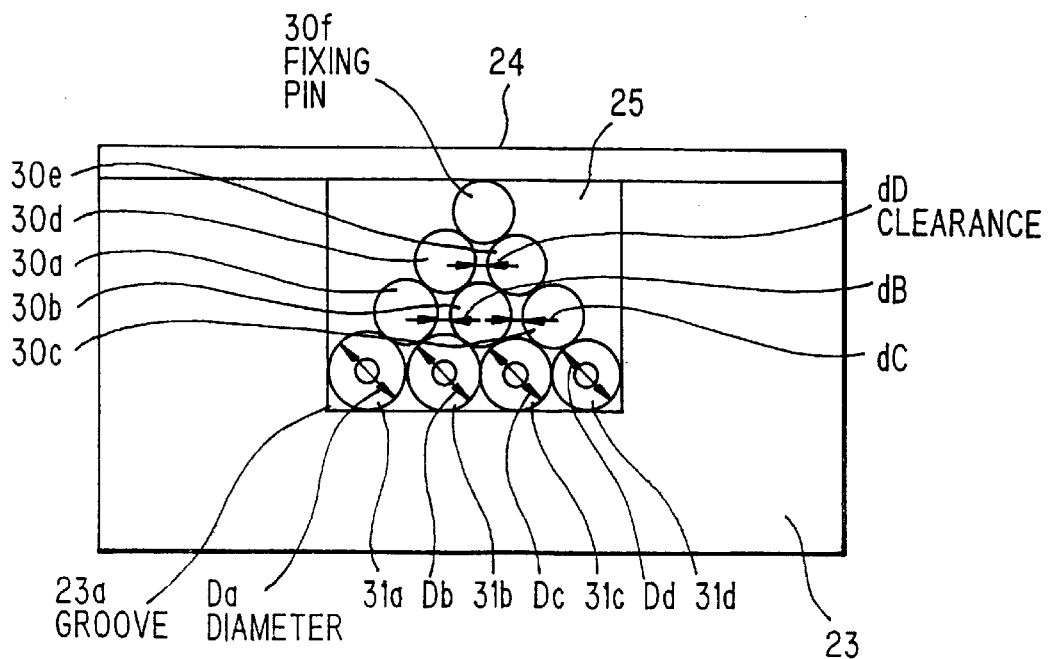
FIG. 5 is a plan view showing an example of a arrayed optical fiber connector, which uses optical fibers that have a dispersion in diameter, according to the invention.

FIG. 5 is a plan view showing an example of a arrayed optical fiber connector, which uses optical fibers that have a dispersion in diameter, according to the invention. In FIG. 5, like parts are indicated by like reference numerals as used in FIG. 3 and their explanations are omitted herein.

The diameters Da, Db, Dc and Dd of optical fibers 31a, 31b, 31c and 31d, respectively, are different from each other. For example, they are 126 μm, 127 μm, 125 μm and 124 μm, respectively.

In using the optical fibers 31a to 31d thus provided, as shown in FIG. 5, though clearances dB, dC and dD occur between the fixing pins (30a, 30b), (30b, 30c) and (30d, 30c), respectively, the fixing pin 30a is contacting the lower optical fibers 31a, 31b and is contacting the upper fixing pin 30d. Therefore, the lateral and vertical movements are restricted, thereby no positional deviation occurs. Also, for the other fixing pins 30b to 30e, in like manner, the lateral and vertical movements are restricted, thereby no positional deviation occurs.

As described above, the fixing pins 30a to 30f absorbs the error in manufacture of the groove 33a or the dispersion in diameter of the optical fibers 31a to 31d so that the optical fibers 21a to 21d or 31a to 31d can be all fixed. Thus, the positional deviation of the optical fibers 21a to 21d or 31a to 31d can be easily prevented.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An arrayed optical fiber connector for positioning multiple optical fibers each having a core and a cladding to align the end faces of the optical fibers with multiple fiber axes at a given input/output face of light, comprising:

a board that includes a groove in which said multiple optical fibers are disposed in a given alignment arrangement;

a plurality of fixing members that are received in said groove such that all of said fixing members are on and above said multiple optical fibers in a given alignment arrangement for absorbing any positional deviations between the respective optical fibers and said groove and none of said fixing members is below any one of said optical fibers; and a fixing plate that is fixed on the surface of the board in which said groove is formed and fixes said multiple optical fibers and said fixing members inside said groove while securing the given alignment arrangement of said optical fibers and said fixing members.

2. An arrayed optical fiber connector according to claim 1, wherein:

said fixing member is a cylindrical member that has a length nearly equal to that of said board in the optical axis direction.

3. An arrayed optical fiber connector according to claim 2, wherein: said cylindrical member is a dummy optical fiber.

4. An arrayed optical fiber connector according to claim 1, wherein:

said fixing member is a multiple of cylindrical members that are stacked on said multiple optical fibers in a triangular cross-sectional form.

5. An arrayed optical fiber connector according to claim 4, wherein:

each of said cylindrical members has a diameter of 121 μm or less.

6. An arrayed optical fiber connector according to claim 4, wherein:

said groove includes a bottom that has a width equal to the sum of the diameters of said multiple optical fibers that are disposed at the lowermost layer in the triangular cross-sectional form.

7. An arrayed optical fiber connector according to claim 4, wherein:

said cylindrical member is a dummy optical fiber.

8. An arrayed optical fiber connector according to claim 4, wherein:

said fixing member is a cylindrical member that has a length nearly equal to that of said board in the optical-axis direction; and each of said cylindrical members has a length nearly equal to that of said board in the optical axes direction.

* * * * *